United States Patent [19]

Edwards

[11] Patent Number: 5,218,280
[45] Date of Patent: Jun. 8, 1993

[54] MOVEMENT ACTUATORS

[76] Inventor: Eric F. R. Edwards, 130, City Road, Cardiff, Great Britain, CF2 3DR

[21] Appl. No.: 603,694
[22] PCT Filed: May 19, 1989
[86] PCT No.: PCT/GB89/00554
 § 371 Date: Nov. 19, 1990
 § 102(e) Date: Nov. 19, 1990
[87] PCT Pub. No.: WO89/11381
 PCT Pub. Date: Nov. 30, 1989

[30] Foreign Application Priority Data
 May 19, 1988 [GB] United Kingdom ............ 8811802
 May 19, 1988 [GB] United Kingdom ............ 8811803

[51] Int. Cl.$^5$ ........................................ G05B 19/42
[52] U.S. Cl. ................................ 318/567; 318/568.18; 318/646; 901/29; 901/21
[58] Field of Search ................... 318/560–620, 318/646; 901/3, 9, 12–24, 37, 47, 33, 29, 28; 623/26; 138/123, 138; 254/93; 92/90; 395/80–89

[56] References Cited

U.S. PATENT DOCUMENTS

| | | | |
|---|---|---|---|
| 4,551,061 | 11/1985 | Olenick | 901/21 X |
| 4,555,953 | 12/1985 | Dario et al. | 901/33 X |
| 4,555,954 | 12/1985 | Kim | 901/33 X |
| 4,575,297 | 3/1986 | Richter | 901/22 X |
| 4,584,625 | 4/1986 | Kellogg | 901/33 X |
| 4,615,260 | 10/1986 | Takagi et al. | 901/22 X |
| 4,689,538 | 8/1987 | Sakaguchi et al. | 901/22 X |
| 4,694,231 | 9/1987 | Alvité901 | 33 X/ |
| 4,739,692 | 4/1988 | Wassam et al. | 901/22 X |
| 4,746,894 | 5/1988 | Zeldman | 901/33 X |
| 4,751,821 | 6/1988 | Birchard | 901/14 X |
| 4,751,868 | 6/1988 | Paynter | 901/22 X |
| 4,784,042 | 11/1988 | Paynter | 901/21 X |
| 4,792,173 | 12/1988 | Wilson | 901/22 X |
| 4,900,218 | 2/1990 | Sutherland | 901/22 X |
| 4,959,958 | 10/1990 | Nishikawa et al. | 901/22 X |
| 5,021,064 | 6/1991 | Caines | 623/26 |

*Primary Examiner*—Paul Ip
*Attorney, Agent, or Firm*—Young & Thompson

[57] ABSTRACT

An actuator for a joint comprises a bladder-shaped chamber 5 whose one end is secured to an arm 2 by a mounting 6, whilst a bundle of fibres 7 extend from the other end of the chamber member 5 to a junction 8 on another arm 3. The rear wall 9 of the chamber member 5 is formed from woven bi-directional fibres 10 whilst the outer wall is defined by an array of high tensile fibres 11, at least some of which extend from the fibre bundle 7. The fibres 7, 10 and 11 are embedded in elastic material. When a pneumatic or hydraulic fluid is pumped through an inlet 12 to the chamber member 5, the latter expands and the fibres 11 bow outwardly, thus pulling on the fibres 7 and raising the arm 3, with the respect to the arm 2, to lift a weight 13.

14 Claims, 2 Drawing Sheets

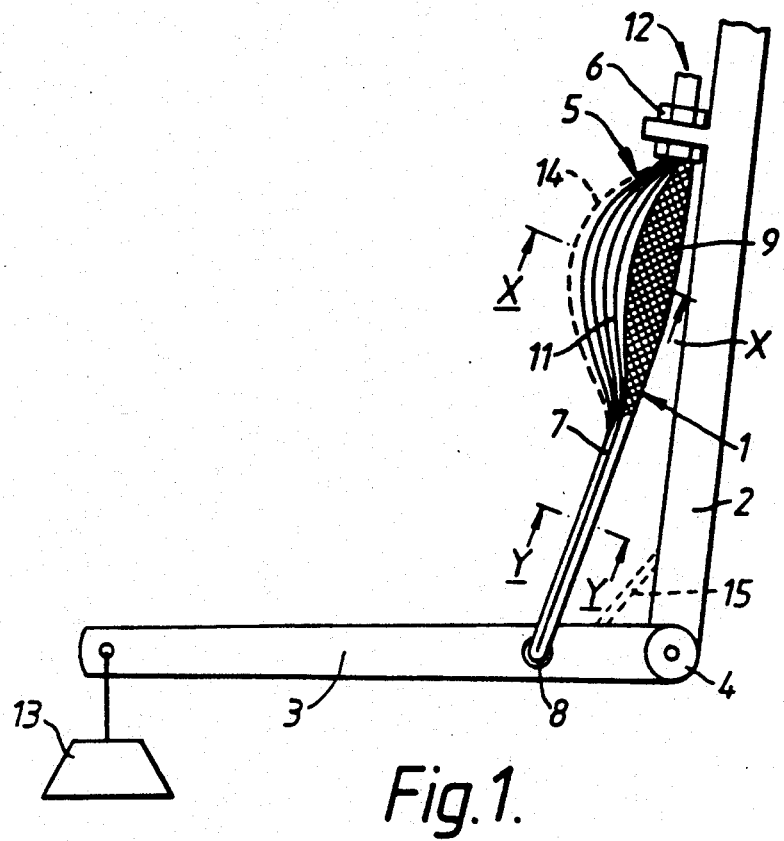
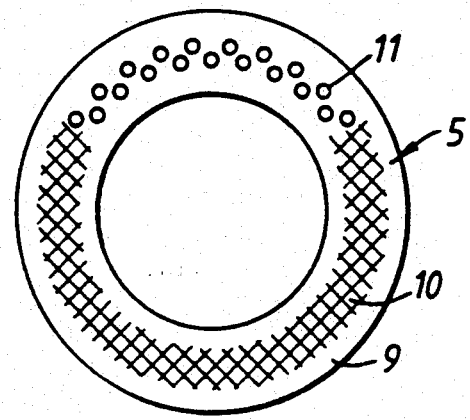
Fig. 1.
Fig. 3.
Fig. 2.

MOVEMENT ACTUATORS

FIELD OF THE INVENTION

This invention is concerned with an actuator whereby controlled movement can be achieved. One important area where such an actuator will be of particular use is in the construction of articulated joints, such as in robotic arms.

BACKGROUND OF THE INVENTION

Robotic joints are commonly operated by electric motors and associated drives, chains, flexible cables, pneumatic or hydraulic pistons, or shape memory alloys. These joints and actuation methods are either bulky, limited in directional capability or expensive in terms of energy. The current actuation methods are incapable of reproducing the versatility in movement of the human body which they are trying to imitate.

SUMMARY OF THE INVENTION

According to the present invention there is provided an actuator comprising an inflatable chamber member having mounting means at one end and a high tensile fibre connecting-link at the other end, the fibre extending along a wall of the chamber member such that expansion of the chamber member will cause the combined length of the chamber member and link to be decreased.

In one preferred construction the chamber member is bladder-shaped and is defined by the combination of one wall which is substantially inextensible and a further wall which has the fibre embedded therein. Alternatively the chamber member may be defined by a collapsible cone having a closed base, with the connecting-link fixed to an edge portion of the cone base and running freely across the face of the cone base and through a guide hole. The guide hole could be defined by a loop fixed to another edge portion of the cone base. Alternatively the guide hole may be defined by a hole in a plate to which the chamber member is attached. Advantageously the connection of the connecting-link to the cone extends back by a fibre or flap across the conical wall of the cone.

The chamber member may be formed from natural or synthetic rubber material, for example nitryl, neoprene, butyl and silicon rubbers, polyurethane, polyethylene, polystyrene and hypalon. Ideally the walls of the chamber member will incorporate reinforcing fibres.

The connecting link can be a single fibre or a bundle of fibres formed from glassfibre, carbonfibre, metal wire, natural or synthetic woven threads or other high tensile fibrous material.

The invention further extends to an artificial joint comprising a pair of pivotally interconnected arms with an actuator of this invention as hereinbefore defined connected between the two arms by the mounting means and the connecting link.

BRIEF DESCRIPTION OF THE DRAWINGS

The invention may be performed in various ways and preferred embodiments thereof will now be described with reference to the accompanying drawings in which:

FIG. 1 is a side view of a robotic joint incorporating an actuator of this invention;

FIGS. 2 and 3 are sections on lines X—X and Y—Y of FIG. 1;

DETAILED DESCRIPTION OF THE INVENTION

Figure 4:
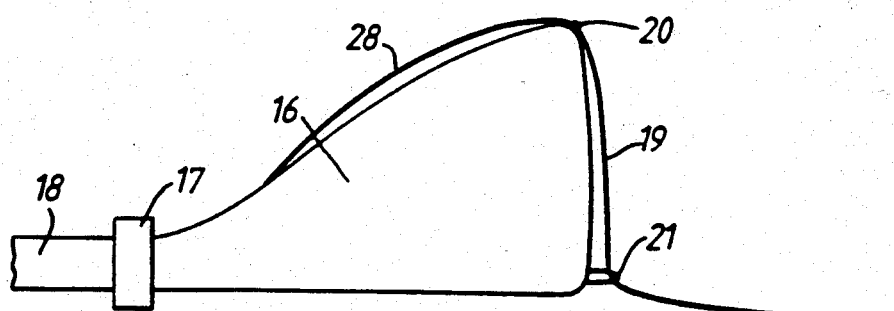
FIGS. 4 to 6 are illustrations of three variant forms of an alternative type of actuator of this invention.

The embodiment illustrated in FIGS. 1 and 3 comprises an actuator 1 which is associated with an articulated joint defined by a pair of arms 2 and 3 which are pivoted at 4. The actuator comprises a bladder-shaped chamber 5 whose one end is secured to the arm 2 by a mounting 6, whilst a bundle of fibres 7 extend from the other end of the chamber member 5 to a junction 8 on the other arm 3. The rear wall 9 of the chamber member 5 is formed from woven bi-directional fibres 10 whilst the outer wall is defined by an array of high tensile fibres 11, at least some of which extend from the fibres 7. Fibres 7, 10 and 11 are embedded in elastic material.

When a pneumatic or hydraulic fluid is pumped through an inlet 12 to the chamber member 5, the latter expands and the fibres 11 bow outwardly, thus pulling on the fibres 7 and raising the arm 3, with the respect to the arm 2, to lift a weight 13. When the fluid is allowed to leave the chamber 5 the arm 3 will drop under its own weight. If required, however, there could be a further actuator 1 arranged to pull the arm 3 in the other direction with respect to, say, a downward extension portion of the arm 2.

Figure 7:
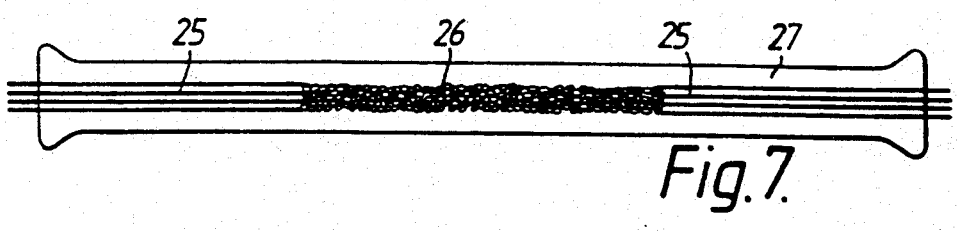
FIG. 7 is an illustration of a linear sensor which can be used in the robotic joint shown in FIG. 1.

The status of the chamber member 5 and of the pair of arms 2 and 3 could be determined by linear movement sensors 14 and 15. These could be of the type as described and claimed in the co-pending International Patent Application filed on the same date as this Application and claiming priority from British Patent Application No. 8811802. One such flexible sensor is shown in FIG. 7 and comprises electrically-conductive high-tensile filaments 25 which are attached to each side of an electrically-conductive elastic block 26 formed to require dimensions to give predetermined performance characteristics. The whole is then coated in an elastic covering 27. The filaments 25 are used to make electrical contacts through which an electrical current is passed. The resulting electrical resistance is measured and is proportional to the degree of linear displacement and tension being applied to the sensor at any given moment, which causes distortion of the conductive elastic block 26, thus altering the electrical resistance characteristics of the block 26.

Figure 5:
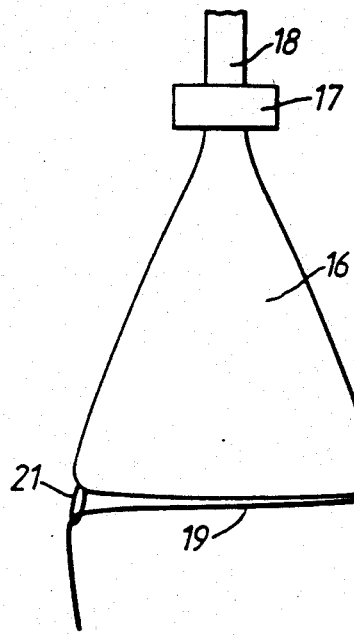
Figure 6:
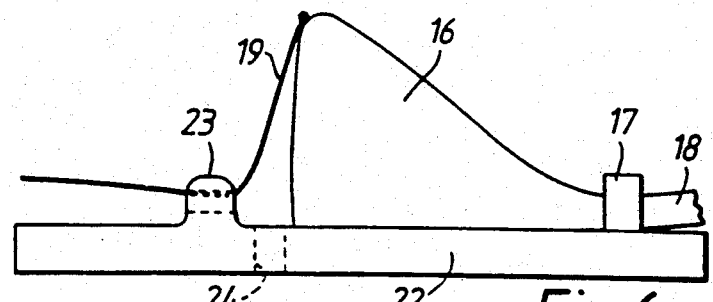

The types of actuator shown in FIGS. 4 to 6 comprise closed cones 16 (preferably of isosceles shape) formed from a flexible, reinforced material. The collar of the cone is secured by a mounting member 17 leaving a mouth 18 through which fluid can be injected to inflate the cone. A fibre, or bundle of fibres, 19 extends from a mounting point 20 at one edge of the base of the cone so as to pass across the base and then through a loop 21 fixed to the cone 16. The mounting of the end of the fibre 19 to the point 20 may be strengthened by an extension of the fibre, or by a flexible flap 28, leading across the conical wall of the cone 16. When the cone is inflated, the fibre 19 will be drawn towards the cone. As shown in FIG. 5 the cone can be mounted vertically. Another arrangement is shown in FIG. 6 where a cone is mounted on a base plate 22 and the fibre 19 passes through an eye 23 projecting from the plate 22. Alternatively the fibre 19 could pass down through a passageway 24 in the plate 22.

I claim:

1. An actuator comprising an inflatable chamber member, the chamber member having two ends and two oppositely disposed walls extending between the two ends, one of said walls being extensible, mounting means at one end of the chamber member, a high tensile fiber connecting link having one end thereof projecting from the other end of the chamber member, the fiber of the connecting link extending along and being embedded in said extensible wall, such that expansion of the chamber member will cause the combined length of the chamber member and the projecting end of the connecting link to be decreased.

2. An actuator according to claim 1, wherein the chamber member is formed from natural or synthetic rubber material.

3. An actuator according to claim 1, wherein the walls of the chamber member incorporate reinforcing fibers.

4. An actuator according to claim 1, wherein the connecting link is a single fiber or a bundle of fibers formed from a material selected from glass fiber, carbon fiber, metal wire, natural or synthetic woven threads or other high tensile fibrous material.

5. An artificial joint comprising a pair of pivotally interconnected arms together with an actuator of a form as defined in claim 11, connected between the two arms by the mounting means and the projecting end of the connecting link.

6. An artificial joint according to claim 15, wherein a linear movement sensor, whose change of length can be measured, is attached between the two arms, the sensor comprising an electrically-conductive block which is elastically deformable between the two ends thereof, and electrically-conductive non-deformable contacts connected to the ends of the block.

7. An actuator comprising an inflatable chamber member, the chamber member having two ends, and being defined by a collapsible cone having a mouth at the one end and a closed base at the other end, the closed base defining a face and an edge portion surrounding said face, mounting means at said one end of the chamber member, a high tensile fiber connecting link having one end thereof projecting from the other end of the chamber member and being attached at a fixing point on the edge portion of the cone base and running freely across the face of the cone base and through a guide hole defined in part of the structure of the actuator opposite to the fixing point such that expansion of the chamber member will cause the combined length of the chamber member and the projecting end of the connecting link to be decreased.

8. An actuator according to claim 7, wherein the guide hole is defined by a loop fixed to the edge portion of the cone base or by a hole in a plate to which the chamber member is attached.

9. An actuator according to claim 7, wherein a fiber or flap extends back from the connection of the connecting link to the cone across the conical wall of the cone.

10. An actuator according to claim 7, wherein the chamber member is formed from natural or synthetic rubber material.

11. An actuator according to claim 7, wherein the walls of the chamber member incorporate reinforcing fibers.

12. An actuator according to claim 7, wherein the connecting link is a single fiber or a bundle of fibers formed from a material selected from glass fiber, carbon fiber, metal wire, natural or synthetic woven threads or other high tensile fibrous material.

13. An artificial joint comprising a pair of pivotally interconnected arms together with an actuator of a form as defined in claim 7, connected between the two arms by the mounting means and the projecting end of the connecting link.

14. An artificial joint according to claim 13, wherein a linear movement sensor, whose change of length can be measured, is attached between the two arms, the sensor comprising an electrically-conductive block which is elastically deformable between the two ends thereof, and electrically-conductive non-deformable contacts connected to the ends of the block.

* * * * *